June 24, 1930. M. SCHMIERER Re. 17,712

FLUORESCENT TUBE

Original Filed Feb. 27, 1914 4 Sheets-Sheet 1

Witnesses:

Emil Pester

Inventor:

Michel Schmierer

June 24, 1930. M. SCHMIERER Re. 17,712

FLUORESCENT TUBE

Original Filed Feb. 27, 1914 4 Sheets-Sheet 2

Witnesses:

Inventor:

Michel Schmierer

June 24, 1930. M. SCHMIERER Re. 17,712

FLUORESCENT TUBE

Original Filed Feb. 27, 1914 4 Sheets-Sheet 3

Witnesses:
Emil Pestor

Inventor:
Michel Schmierer

June 24, 1930. M. SCHMIERER Re. 17,712

FLUORESCENT TUBE

Original Filed Feb. 27, 1914 4 Sheets-Sheet 4

Witnesses:
Emil Poster

Inventor:
Michel Schmierer

Reissued June 24, 1930 Re. 17,712

UNITED STATES PATENT OFFICE

MICHEL SCHMIERER, OF BERLIN-LICHTERFELDE, GERMANY, ASSIGNOR TO RADIO PATENTS CORPORATION, OF NEW YORK, N. Y., A CORPORATION OF NEW YORK

FLUORESCENT TUBE

Original No. 1,595,735, dated August 10, 1926, Serial No. 821,609, filed February 27, 1914, and in Germany March 5, 1913. Application for reissue filed October 6, 1927. Serial No. 224,509.

This invention relates to systems and apparatus for electrically producing images employing gaseous conduction devices, particularly, to so-called fluorescent tubes or glow lamps.

More especially it relates to means for transmitting pictures by electricity, but may also be used for other purposes, for example, for indicating the direction of a current in Röntgen ray plans, for advertising purposes and the like.

All arrangements for transmitting pictures over great distances are based on the principle, that the picture to be transmitted at the transmitting station is divided into luminous points, the intensities of which are converted into changes in an electric current and are transmitted either simultaneously or successively (by means of alternating currents of different frequency), while at the receiving station the reverse process occurs, the incoming current impulses being reconverted into luminous points of corresponding intensity, which are then assembled to form a picture. At the receiving station there must therefore be an arrangement which allows of converting changes in an electric current into changes in the intensity of light. Of the devices which have been suggested for this purpose, electric fluorescent tubes afford the advantages of consuming very little energy, of the color of the light radiated being unchangeable and, above all, of the absolute absence of inertia. Furthermore they require little space, are proof against vibrations and may be produced at a moderate cost. Hitherto they were only employed in form of so-called Geissler tubes, namely, tubes which have been evacuated to a comparatively high degree, the whole space in which will fluoresce when a current passes between the electrodes. These Geissler tubes have only a small intensity, so that it requires a comparatively long exposure to sufficiently affect the sensitive emulsion. A further disadvantage of the Geissler tubes is this, that a picture which has been received by their aid is composed of light and dark superficial elements. Such a picture cannot however, like a photograph, be directly reproduced by any printing method, and would first have to be divided by a line screen by copying it through such on to a zinc plate covered with chromo-gelatine, so as to produce a printing block which may be used after the known half tone method. A half tone picture consists, as generally known, of large and small points scattered in a chessboard manner over the surface of the picture. By the different size of these points the various shades are produced. The larger the points at one part of the picture, the darker this part will appear, if the picture is observed at a sufficient distance, so that the individual points can not be distinguished. For practical reasons it is however, impossible to copy a picture, which has been divided up into superficial elements a second time through a screen if the latter is not so fine that a large number of points come on each of the said superficial elements. The number of the screen is, however, by no means optional, as it depends on the quality of the paper on which the picture is to be printed. So for instance a screen ruled at 2 lines per millimeter, thus containing 4 points per square millimeter is used for common newspaper. If likewise 4 points per superficial element of the picture to be transmitted are considered as sufficient, the superficial element would be 1 square millimeter. It would be impossible to reproduce finer details of a picture. It therefore appears advisable to produce the pictures transmitted directly in a half tone manner, so that they may be copied on to the zinc plate without need of a screen. For this purpose the device which converts the current changes into light changes must produce not only light spots of even size and different intensity but also different size as well. This object is obtained by means of the fluorescent tube hereinafter described, which also meets the second requirement, namely of producing a more intense light than a common Geissler tube. The size of the luminous spots produced by this tube, on a current passing through it, is in direct proportion to the intensity of the current.

Figure 5:
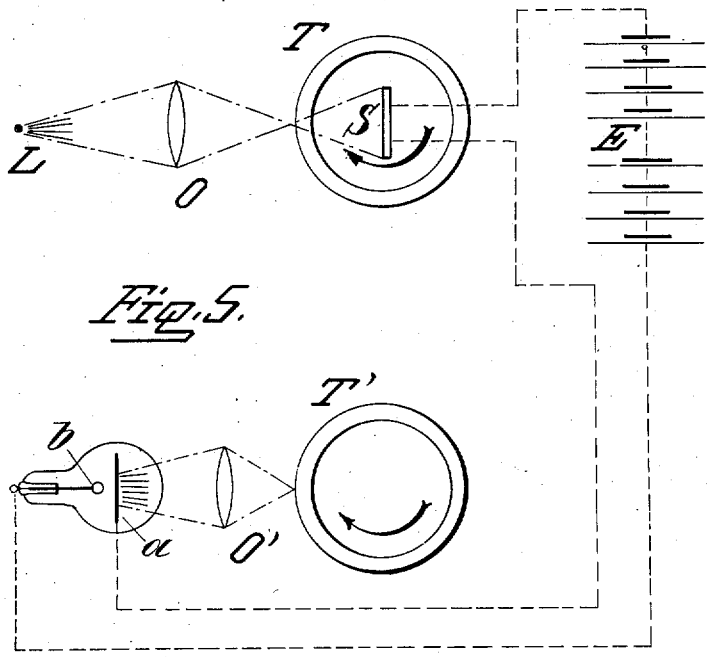
Figure 6:
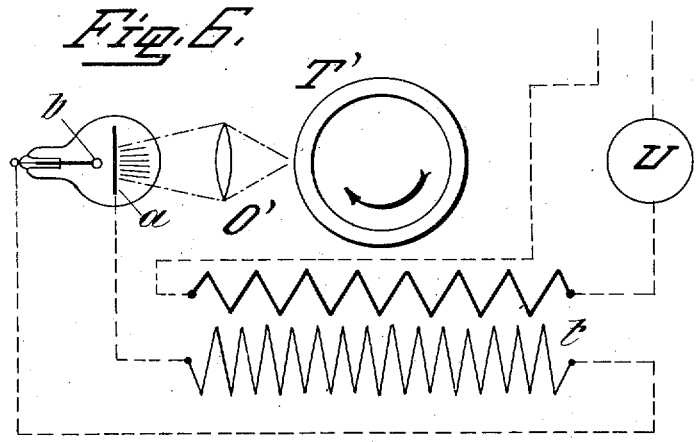
Figure 7:
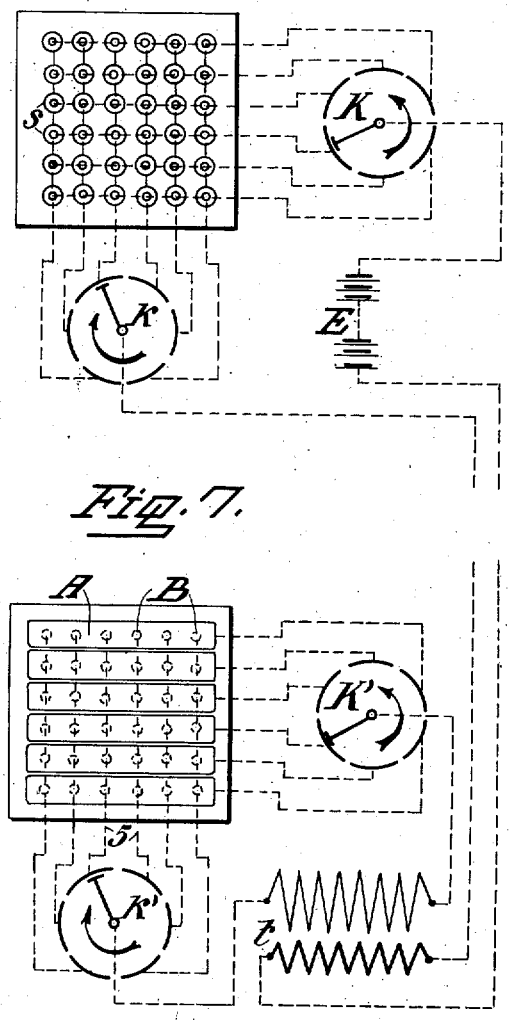

Figs. 5 to 7 exemplify systems for transmitting images. Fig. 5 shows a direct connection. Fig. 6 shows an indirect connection, a single selenium cell being used at the transmitter and a single fluorescence tube at the receiver, and Fig. 7 the indirect connection with a plurality of selenium cells and fluorescence tubes respectively.

Figure 8:
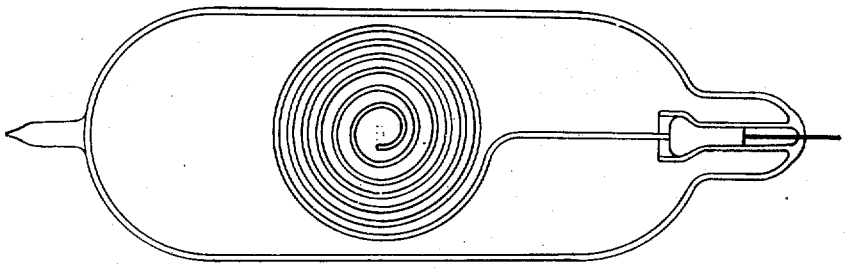

Fig. 8 is an elevational view of an alternative form of glow lamp or fluorescent tube having a spiral anode.

Figure 1:
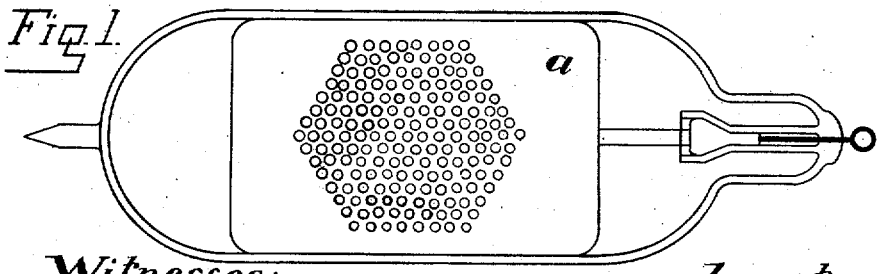
Fig. 1 is a front elevation of the tube.
Figure 2:
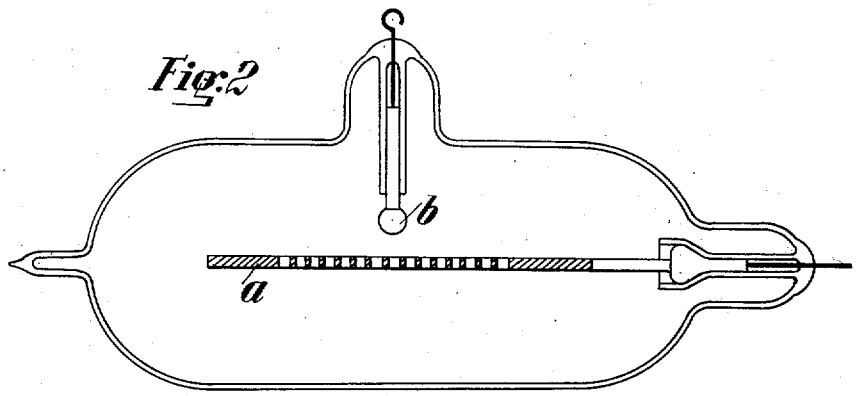
Fig. 2 is a horizontal section.

In Figs. 1 and 2 *a* and *b* are the two electrodes of the fluorescent tube. The electrode *a* is a perforated plate, a grating, a netting or the like, made of metal, preferably of aluminum. It may also consist of a spirally wound wire or strip of sheet metal such as shown in Fig. 8. It is, however, preferable to make it of one solid piece, by drilling holes of even diameter at an even and as small as possible pitch into a metal plate. The hexagonal shape of the plate shown in the drawing allows of a good utilization of the space with comparatively large strength and comparatively easy working. Any other arrangement of the holes with the same size and number of holes per superficial unit, would result in a smaller thickness of the webs between the individual holes and thus render the making of the electrode more difficult. Otherwise the arrangement of the holes is immaterial with regard to the subdivision of the picture to be transmitted into superficial elements.

The electrode *b*, which is likewise preferably made of aluminum, is much smaller than the electrode *a*, and, seen from the observer, it is arranged behind the same.

The tube is filled with an inert gas, preferably nitrogen and evacuated until the gas pressure amounts to only a few millimeters mercury column. If one of the rare gases, such as helium or neon is used for filling the tube, the current consumption will be considerably lower. The radiated light is, however, poor in actinic rays, so that no material advantage would be derived therefrom if the tube is to be used for tele-photographic purposes. For tele-optical purposes, luminous advertising signs and the like such a filling would, however, be of advantage. When a current is sent through the tube the two electrodes will luminesce, the electrode connected to the negative pole of the source of current being of the higher intensity. The luminosity at the positive pole is practically negligible. For this reason the luminous electrode *a* should, in most cases, be made the cathode. The radiated light in this case will consist of a rather clearly defined, almost circular illuminated spot if the anode *b* is a rotation body, the axis of which is vertical to the plane of the cathode, thus, for example disc, ball, cylinder, cone, truncated cone or the like. The spherical shape indicated in the drawing has the advantage that in case the stem of the electride should be fused in obliquely this will not affect the effectiveness of the tube, as the effective part of the anode *b*, turned towards the cathode *a* will, in all cases, be a hemisphere. However, the distance between the two electrodes must be somewhat greater than would be the case if the electrode *b* were to terminate in a point, which will require a higher pressure. If the electrode *b* is a polygonal body, thus either a prism, pyramid, truncated pyramid, star or the like the tube will, on the passage of a current, show the tendency to produce a polygonal luminous spot instead of a round one. When a four-cornered electrode *b* is used, especially a four point star, there will be produced at low current an almost circular luminous spot, at medium current an almost square, luminous spot, and at a high current a star shaped luminous spot will be obtained. This fully corresponds with the conditions of a half tone, in which small points are round, medium points square and large points starshaped. If the electrode *b*, lastly, has on the side turned towards the electrode *a* several projecting parts, or if there are several electrodes *b* conductively connected with each other, as many luminous spots will, on the passage of a current be produced, as there are projecting parts or electrodes *b*. The outlines of the individual luminous spots will then, of course, correspond to the shape of the electrode *b*. The use of such subdivided electrodes *b* is then preferable, when the picture received shall be of a finer ruling than the picture transmitted.

The area of the luminous spot, or the total area of the luminous spots is almost directly proportional to the intensity of the current. The intensity of the light likewise increases with the intensity of the current. The radiation is the most intense within the holes in electrode *a*. If the radiation is to be limited to the face of the electrode and the space in the holes, the electrode may, on its reverse side, be covered with an insulating material, for example a coat of varnish.

The luminous intensity of the fluorescent tube increases with the decreasing of the sectional area of the holes. It is, therefore, in most instances preferable to make the size of the holes as small as possible, as the kind and the pressure of the gas allows. The higher the gas pressure, the smaller the size of the hole may be, as the thickness of the dark layer covering the cathode, which is necessary for producing the fluorescence decreases with the gas pressure. As the gas pressure in tubes in use decreases in time, as shown by experience, and the thickness of the dark layer thus increases, the size of the openings should be chosen so that the development of the dark layer, even after long use, will not be prevented by the opposite inside walls of the holes.

The luminosity of the tube is further in proportion to the thickness of the electrode plates, or to the thickness of the electrode *a* respectively. The best results are obtained with electrodes, which are made of 3 millimeter plate.

For the purposes of the slower tele-photography for instance by aid of such processes in which one single selenium cell is used in the transmitter for converting the intensity of the individual elements of the picture into corresponding current changes, preferably also one single fluorescent tube is used in the receiver for re-converting the current changes into corresponding light changes. In doing so an arrangement must be made, by which the rays of light radiating from the tube will strike only such part of the sensitive film, which corresponds to the respective acting part of the picture being transmitted. This may be effected, by the tube being passed in a zig-zag line or a spiral line in front of the sensitive film, or in a helical line around the same, when the latter is wrapped on a drum. Vice versa the tube may also be stationary, and the sensitive film will receive a corresponding movement. Also both tube and film may be stationary and the rays emanating from the tube may be directed by suitable optical means, such as a revolving or an oscillating mirror to the part of the sensitive film corresponding to the respective acting part of the picture being transmitted. Or the rays may be allowed to pass through correspondingly shaped hole or slit shutters onto such parts only. It may also be possible to combine any or several of these methods.

Figure 3:
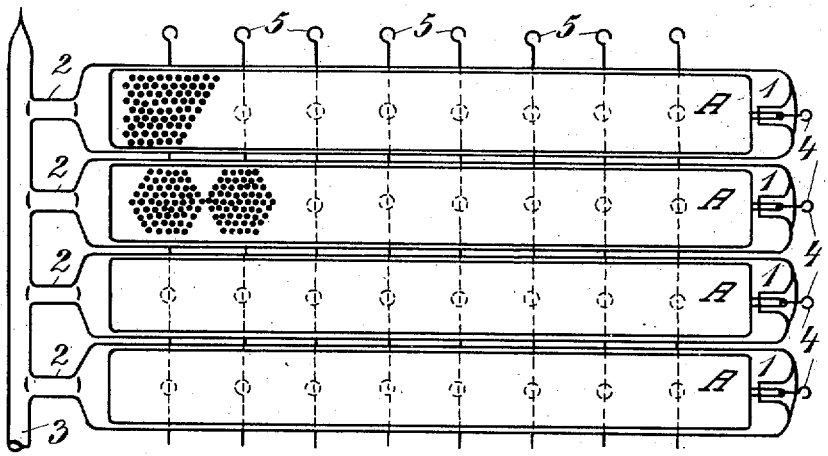
Figs. 3 and 4 show a combination of a plurality of tubes to a panel of tubes, Fig. 3 being an elevation, Fig. 4 a horizontal section.
Figure 4:
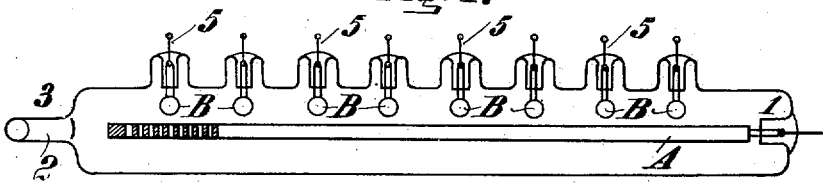

For tele-visual purposes and for rapid tele-photography, for instance such methods, in which a plurality of selenium cells are employed in the transmitter, also these tubes are preferably employed in a larger number. With a method, in which the several cells are arranged on a panel in such a manner, that they preferably form parallel lines at right angles to each other and at an even pitch, the tubes are preferably arranged in the receiver of the same number and according to the same plan. Then one selenium cell and one fluorescent tube each will correspond to each luminous point of the picture or image. These may either by aid of alternating currents of different frequency transmit the intensities of the individual luminous points simultaneously, or they may be successively connected by means of synchronous commutators into the same circuit. The stronger the selenium cell is lighted, the brighter thus the luminous point, the larger and brighter will be the lighted spot on the plate *a* of the corresponding fluorescent tube, so that the panel of fluorescent tubes reproduces the picture transmitted with its accurate gradations of light. Such a panel of fluorescent tubes may be greatly simplified in its arrangement, by combining according to Fig. 3 (elevation) and Fig. 4 (horizontal section) the tubes of each row with each other to a multiple tube 1, in which the electrodes *a* are fused to one single strip-shaped electrode A, behind which the other pole electrodes B are arranged at even pitch, one for each luminous point. Of course also here subdivided electrodes B may be employed, when the received picture shall have a finer ruling than the picture transmitted. It is rather immaterial as regards the operation of the tube, which shape and arrangement of the holes in the electrode A are employed, and here the same remarks apply as to the single electrode *a* of the single tube. If the electrodes A are made of one single strip of sheet metal, the same may be continuously perforated as this is indicated in the uppermost electrode in Fig. 3, or, a star of holes may be provided for each of the electrodes B, as it is shown in the second electrode A. The commutation of such a tube panel may be performed in either of two ways. Either, all electrodes A are connected parallel and the electrodes B are connected singly with the sections of a commutator, in which case a luminous spot is produced at that part of the panel only, which corresponds to the electrode B which, for the moment is connected through the commutator; or, the wires leading from each row of the electrodes B, at right angles to the electrodes A, are connected with wires 5 (Figs. 3 and 4) and the electrodes A and the rows of electrodes B are commutated separately. In this latter case a luminous spot is produced only at such point where the connected electrode A crosses the row of electrodes B connected. This method of commutation is illustrated in Fig. 7 wherein the picture or image to be transmitted is projected by a suitable optical arrangement on the bank of cells S. By means of commutators K and $K^1$ at the transmitting station and commutators *k* and $k^1$ at the receiving station of each cell corresponding to a point on the image is successively connected in circuit with correspondingly situated sets of the electrodes AB in the receiver the receiving lamp being thus lighted point by point in succession. It will be understood that the commutators will be rotated with sufficient velocity so that the complete image is completely scanned and reproduced within the retentivity period of the human eye or in about $\frac{1}{16}$ of a second. Preferably, and for facilitating the evacuation, and securing a uniform gas-pressure in all multiple tubes, the individual tubes of the panel are connected by means of short intermediate tubes, or fused by means of short tubes 2 to a transverse tube 3. This object may also be obtained by the totality of the electrodes A and B being arranged within a common glass vessel, and, for further simplification, all electrodes A may be fused to one large plate, or, the electrodes B may be conductively connected with each other in rows, whereby fused joints may be saved. In the latter case the saving in fused joints will be greater, but in the former case the advantage is derived, that luminous spots may be produced, the diameter of which is larger than the distance between the electrodes B, whereby a larger richness in contrasts of the picture received may be obtained. The glass wall closing the receiving vessel at the front, must be convex, so as to be able to bear the pressure of the atmosphere.

A panel of fluorescent tubes may, of course also be employed with such plants for picture telegraphy, in which there is only one single photo-electric element (selenium cell or the like) in the transmitter. Vice versa it is also possible to employ with a plant comprising a plurality of photo-electric elements, at the receiving station only one single tube or a small number of tubes. In particular it is possible both with the method employing one single selenium cell, and with that employing a plurality of selenium cells to use a multiple tube, if the luminous rays emanating from the latter are given, relatively to the sensitive film such a movement, that gradually the whole surface of such film is covered, as this has been described with reference to the single tube. Generally it is, however, preferable, to employ the same principle at both stations, thus the same number of tubes, or electrodes B, as there are sensitive to light elements. This affords the advantage, that the whole plant is simpler and that the same driving mechanism may be used for both stations.

For feeding such fluorescent tubes a current of a few hundred volts only is sufficient. The intensity of the current is extremely small, so that it is possible to connect them directly in series with the light sensitive element or elements of the transmitter. This connection is diagrammatically exemplified in Fig. 5 for a plant in which at the transmitter the picture to be transmitted is wrapped in form of a film on a revolving and axially advancing glass drum T, while at the receiver the sensitive film is likewise wrapped on a drum T′, which has a synchronous movement. In such arrangements generally one single photo-electric element is employed in the transmitter and one single light regulating element at the receiver. In Fig. 5 O is the lens through which the light of the lamp L is concentrated in one point on the surface of the picture to be transmitted, whereupon, after it has been reduced according to the intensity of this point, it falls onto the selenium cell S. Sometimes with such arrangements the conversion of the intensities into current fluctuations is also obtained by the picture to be transmitted being applied to the drum, not in form of a film but of a chromo-gelatine plate or also a half tone on a metallic foil, and a feeler which successively covers the whole surface sends either directly by electric means (under utilization of the variable conductivity of the chromo-gelatine film) or by mechanical means (under utilization of the different heights of the film) currents corresponding to the intensities into the transmission line. The receiving arrangement remains, however, the same. E is the source of current. At the receiver O′ is the lens, which produces the image of the luminous spot produced on the electrode *a* on the sensitive film, which is laid around the drum T′. It is, however, for practical use, not advisable to connect the fluorescent tube directly into the transmission line. It would have the disadvantage that the transmitter would be greatly endangered by a possible short-circuit in the transmission line. Furthermore such direct connection has the disadvantage, that the fluctuation of the total resistance in the circuit, thus also the changes in the intensity of the current are not proportional to the changes in the resistance of the photo-electric element, as the invariable resistance in the transmission line and the not greatly varying resistance of the fluorescent tube adds to the resistance of the light sensitive element. For this reason an indirect connection is to be preferred, in which the current is transformed to a higher voltage. Fig. 6 illustrates such connection for the receiver of a plant, the transmitter of which corresponds to Fig. 5. U is the interruptor, which is used to convert the transmitter current into an intermittent direct current, as the direct current derived from the battery B cannot be transformed. The interruptor might also be arranged at the transmitter station. If, instead of the battery E a source of alternating current is employed the interruptor is not necessary. *t* is the transformer. Also this transformer may be arranged at the transmitter. This affords besides a low voltage at the terminals of the photo-electric element, the further advantage, that the fluctuations of the current in the transmission line, thus also in the fluorescent tube are almost proportional to the changes in the resistance of the photo-electric element, as the resistance in the primary winding of the transformer is very low compared to the resistance of the transmitter, while the resistance in the transmission line is considerably greater. It is the best, to employ a double transformation, and to provide a transformer both at the receiving and at the transmitting stations. This affords the further advantage of a low voltage in the transmission line.

For increasing the transmission speed a larger number of selenium cells may be employed with the arrangement shown in Figures 5 and 6, these cells being successively connected into the circuit. For reason of a greater simplicity as many fluorescent tubes may be provided in the receiver. If the selenium cells are arranged in such a manner, that they are influenced by luminous points axially adjoining each other, in which case the axial travel of the drums must be accordingly faster, it is possible to employ in the receiver instead of several tubes one single multiple tube of the kind shown in Figs. 3 and 4, one single lens O′ reproducing all luminous points as luminous points lying axially next to each other on the photo-sensitive film.

Also when the selenium cells are arranged in such a manner, that they are influenced by points at greater distances from each other, it is possible to employ a multiple tube, only then the distance between the electrodes B must be made accordingly greater. The latter arrangement has the disadvantage, that for each of the selenium cells and for each of the electrodes B a separate lens must be provided.

In case one single tube is used, or a multiple tube, it is advisable, for producing greater contrasts in the received picture, to make the dimensions such, that the images of the luminous spots on the photo-sensitive film will, at highly illuminated selenium cells be larger than the distance between the neighbouring luminous points of the received picture. Then the images will more or less overlap with their edges, so that only very small dark points will remain between them.

Fig. 7 illustrates an indirect connection in the case of an arrangement, with which a larger number of selenium cells *s* are employed in the form of a panel in the transmitter. The individual cells are preferably connected successively by means of two commutators K and *k* into the circuit, of which commutators the one connects the cells in rows, and the other, revolving at a higher speed, connects the cells of each row. In the receiver the electrodes A and B of the panel of fluorescent tubes are connected in a similar manner by means of two synchronously revolving commutators K′ and *k*′ in the same series. The commutator, revolving at the higher speed, of the transmitter may also, at the same time, serve as interruptor. Instead of the panel of tubes one single multiple tube may be employed, which is moved in the plane of the panel, or with which a relative corresponding movement between the images of the luminous spots and the photo-sensitive film after one of the methods described hereinbefore with reference to the single tube is produced. Otherwise the same applies here as has been said with reference to the Figures 5 and 6. Of course the transmitter according to Fig. 7 may also be used in combination with the receiver according to Fig. 5 and vice versa the receiver according to Fig. 7 may be used with the transmitter according to Fig. 5, provided an intermittent direct current or an alternating current is employed.

In all instances, where several selenium cells or fluorescent tubes are employed, it is also possible instead of the successive connection, to operate simultaneously, if several transmission lines are available, or, if only one such transmission line is available, alternating currents of different frequencies are employed, each tube selecting its corresponding current by a correspondingly tuned resonance circuit.

With such fluorescent tubes the sensitiveness may be regulated, besides the regulation of the gas pressure which comes less into question for practical use by varying the step of the transformers, and by adding resistances or by superimposing a direct or an alternating voltage. By the latter it is possible to convert the alternating current supplied by the transformers into intermittent direct current, or, into an unsymmetric alternating current, the maximum value of the positive momentary pressures of which may optionally be larger or smaller than the maximum of the negative momentary pressures and vice versa. The regulation is preferably effected in such a manner, that when the selenium cell is not illuminated, the tube is but slightly luminescent, and when the cell is strongly illuminated a luminous spot it produced, the maximum diameter of which is about 1¾ times as great as the distance between the electrodes, or the image of which is, at the same rate, larger than the distance between neighbouring points of the picture received. Then the latter will, as regards appearance, fully correspond to a half tone, in which, for practical reasons there are always still small dark points in the highest lights, and small light points in the deepest shadows.

If the transmitting current is increased by a quantitative relay with variable current increasing factor, the regulation of the sensitiveness of the fluorescent tube may also be effected by varying the rate of the relay, or by employing a variable shunt connected parallel to the relay.

I claim:

1. The combination in a glow lamp, of a plurality of anodes and a plurality of cathodes, said anodes and cathodes being arranged in cooperative relation and disposed in coordinate rows.

2. The combination in a glow lamp, of a plurality of cathodes each consisting of a metal strip, said cathodes being arranged in parallel relation, and a plurality of anodes arranged in coordinate rows, said cathodes being adapted to cooperate with said anodes.

3. The combination in a glow lamp, of a plurality of parallel cathodes each consisting of a perforated metal plate, and a plurality of rows of anodes each disposed opposite one of said cathodes and adapted to cooperate therewith.

4. The combination in a glow lamp of a pair of spaced cooperating electrodes, one of said electrodes being perforated, the other of said electrodes being disposed in such relation to the perforated portion of the perforated electrode that a luminescent phenomenon occurs within the perforation.

5. The combination in a glow lamp of a perforated electrode element and a second electrode element disposed in spaced relation to said first electrode element, circuit connection terminals for said electrode elements, the arrangement being such that upon a suitable potential being applied between said electrode elements, a luminous discharge is produced in and about the perforated portion of said first electrode, said luminous discharge being visible from the side of said first electrode opposite the other of said electrodes.

6. The combination in a glow lamp of a plate forming an electrode, said plate having a plurality of separated areas, each of which is perforated and a plurality of additional electrodes each of which is individually disposed in spaced relation to one of said perforated areas.

7. In combination, a glow discharge lamp comprising a plurality of spaced electrodes in row formation, a single electrode adapted to cooperate with said spaced electrodes, and lead in means for conducting a potential producing a discharge between said common electrode and each of said first mentioned electrodes in succession.

8. In combination, a glow discharge lamp comprising a plurality of spaced electrodes arranged in parallel rows, a continuous electrode for each row of spaced electrodes, and lead in means for conducting a potential producing a discharge between each common electrode and each of the associated spaced electrodes in succession.

9. In combination, a glow discharge lamp comprising a continuous electrode, a plurality of spaced electrodes arranged in a row parallel to said continuous electrode, and means lead in for conducting a potential causing a discharge between any one of said spaced electrodes and a corresponding portion of said continuous electrode.

MICHEL SCHMIERER.